United States Patent [19]

Teramae et al.

[11] Patent Number: 4,681,201
[45] Date of Patent: Jul. 21, 1987

[54] CLUTCH DISC

[75] Inventors: Hiroshi Teramae, Neyagawa; Yoshinari Yoshimura, Higashi, both of Japan

[73] Assignee: Kabushiki Kaisha Daikin Seisakusho, Osaka, Japan

[21] Appl. No.: 785,437

[22] Filed: Oct. 8, 1985

[30] Foreign Application Priority Data

Oct. 12, 1984 [JP] Japan .............................. 59-154794[U]
Oct. 19, 1984 [JP] Japan .............................. 59-158786[U]

[51] Int. Cl.⁴ .............................................. F16D 3/14
[52] U.S. Cl. .............................. 192/106.2; 192/70.16; 464/185
[58] Field of Search ................. 192/70.16, 70.2, 106.2, 192/106.1, 30 V; 74/409; 464/68, 185

[56] References Cited

U.S. PATENT DOCUMENTS

| | | | |
|---|---|---|---|
| 3,122,938 | 3/1964 | Visser | 74/409 |
| 3,897,859 | 8/1975 | Norcia | 192/106.1 X |
| 4,446,955 | 5/1984 | Lech, Jr. | 192/106.2 |

Primary Examiner—Carl D. Friedman
Attorney, Agent, or Firm—Armstrong, Nikaido, Marmelstein & Kubovcik

[57] ABSTRACT

A clutch disc having a spline hub spline fitting onto a main drive shaft, characterized by that the clutch disc is equipped with a forced inclining mechanism, in which a spline hole of the spline hub is forcedly inclined in relation to an axis of the main drive shaft under a condition that a facing surface is pressed on a flywheel, and the spline hole of the spline hub is kept parallel with the axis of the main drive shaft under a condition that the facing surface is not pressed thereon.

7 Claims, 5 Drawing Figures

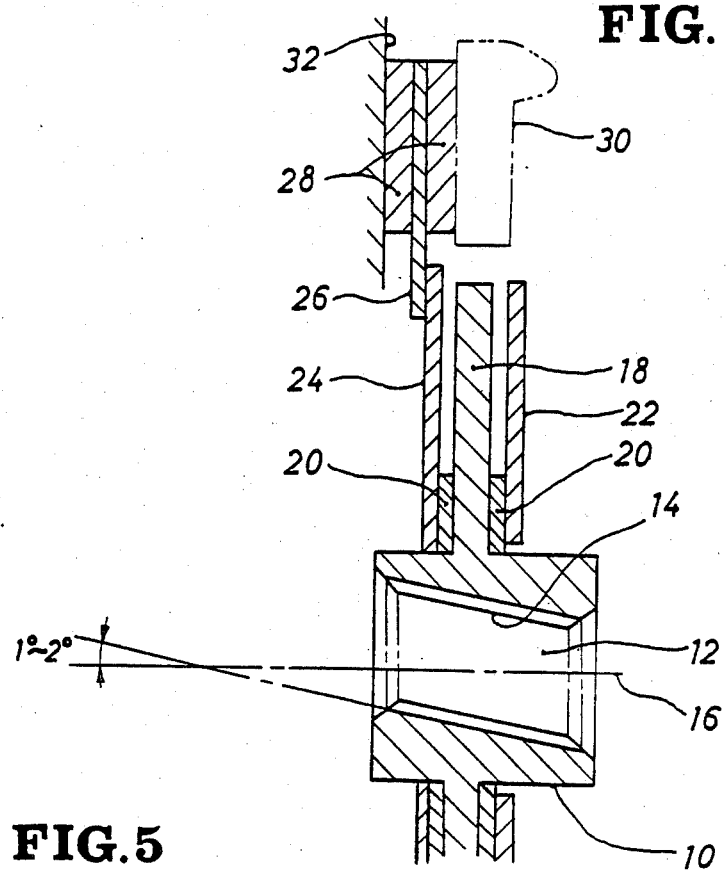
FIG. 1
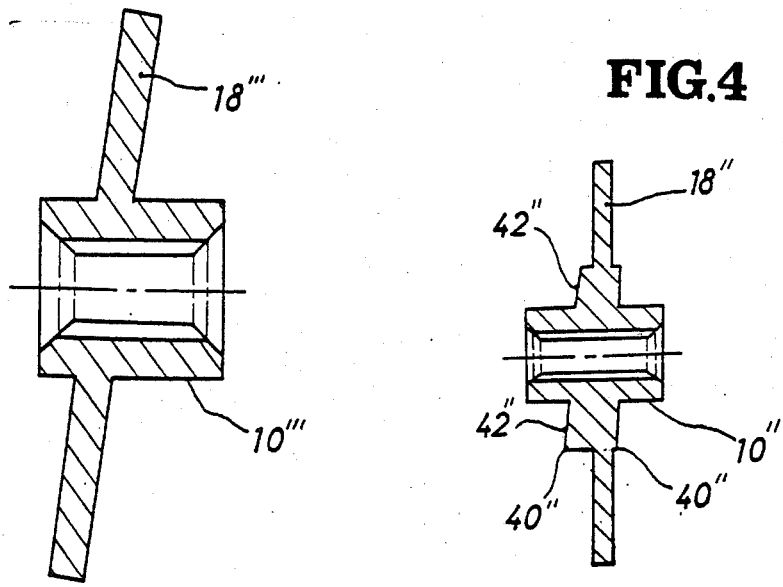
FIG. 5
FIG. 4

CLUTCH DISC

BACKGROUND OF THE INVENTION

1. Industrial useful field

This invention relates to a clutch disc, especially to a clutch disc to control tooth chattering sound.

2. Prior art

A spline hub of a clutch disc is spline fitting onto a main drive shaft with a slight clearance provided between the internal teeth of the spline hub and spline external tooth of the main drive shaft so as to avoid a faulty disengement at the time of clutch operation.

However, during an idling of engine for example, the spline internal teeth of the spline hub strikes against the spline external teeth of the main drive shaft due to a torque fluctuation of engine even in case of such a slight clearance, so that chattering sound will be emitted therefrom.

3. Object of the invention

An object of this invention is to provide a clutch disc which can control chattering sound emitted from between the spline internal teeth of the spline hub and the spline external teeth of the main drive shaft, and which is free from the faulty disengagement at the time of clutch operation.

4. Structure of the invention

A clutch disc having a spline hub spline fitting onto a main drive shaft, characterized by a spline hole of the spline hub is inclined in relation to an axis of the main drive shaft while the cluth is disengaged and the spline hole of the spline hub is kept parallel with the axis of the main drive shaft when the clutch is engaged.

BRIEF DESCRIPTION OF THE DRAWINGS

FIG. 1 is a vertical sectional partial view of a clutch disc according to a first embodiment of this invention.

FIGS. 4 and 5 are vertical sectional views of spline hubs showing different embodiments respectively.

DETAILED DESCRIPTION OF THE INVENTION

Embodiments (1) First embodiment

Figure 2:
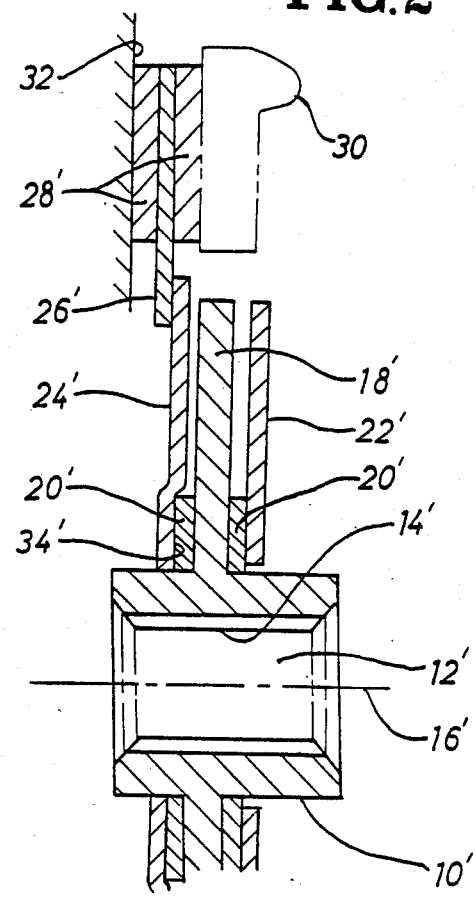
FIG. 2 is a vertical sectional partial view of a clutch disc according to a second embodiment of this invention.

In FIG. 1 showing the clutch disc according to the first embodiment in which, 10 is a spline hub. Spline internal teeth 14 are formed in spline hole 12 of spline hub 10. Although an inclination angle of the spline internal teeth 14 is shown in FIG. 1 exaggeratedly for the purpose of illustrating, the actual inclination angle may be as small as 1°~2° in relation to a center line 16 of a main drive shaft (not shown). A retaining plate 22 and a clutch plate 24 are pressed on opposite sides of flange 18 of the spline hub 10 with friction washers 20, 20 therebetween, respectively. A cushioning plate 26 is fixed to an outer peripheral part of the clutch plate 24, and facings 28 are fixed on the opposite sides of cushioning plate 26. The facings 28 are pressed between flywheel 32 and pressure plate 30 to transmit power.

In operation, when clutch facings 28 are disengaged between flywheel 32 and pressure plate 30, spline internal teeth 14 of the spline hub 10 are pressed on a spline external teeth (not shown) of the main drive shaft in an inclined position so that one end of the spline internal teeth 14 deeply cuts into the spline external teeth while the other end of the spline internal teeth 14 shallowly mesh with the spline external teeth, Thus, effective drive clearance between the spline internal teeth 14 and the spline external teeth, when the clutch is disengaged, becomes zero.

While the clutch is engaging and facings 28 are engaged between flywheel 32 and pressure plate 30, the spline hub 10 freely changes position and spline internal teeth 14 became parallel with the center line 16 of the main drive shaft and the external teeth on the drive shaft. Thus, the clutch is engaged in conventional manner.

In a machining process of the spline internal teeth 14, a prepared hole is first drilled at a specified inclination angle, then the spline internal teeth 14 are formed by passing a broaching tool through the inclined prepared hole.

As mentioned above, the clutch disc according to the first embodiment of the present invention, which has the spline hub spline fitting onto the main drive shaft, is equipped in the spline hub with the spline internal teeth 14 wherein the spline hole 12 of the spline hub 10 is forcedly inclined in relation to the axis of the main drive shaft under a condition that the facing surface is pressed on the flywheel 32, and the spline hole 12 of the spline hub 10 is kept parallel with the axis of the main drive shaft while the clutch is engaged. When the clutch is disengaged and facings 28 are not being pressed between flywheel 32 and pressure plate 30, the spline internal teeth 14, at one end of such teeth, cut into the spline external teeth (not shown) of the main drive shaft by a depth corresponding to the above-mentioned angle. One end of the spline internal teeth 14 deeply cuts into the spline external teeth. The other end of the spline internal teeth 14 shallowly mesh with the spline external teeth. Thus the effective drive clearance between the spline internal teeth 14 and the spline external teeth becomes zero. Chattering sound is not emitted from between the spline internal teeth 14 and the spline external teeth even when the engine torque fluctuates. A silent clutch disc is provided.

In the operation of the clutch, at the time when the pressure on the facing 28 is released, the position of the spline hub 10 becomes freely changeable and the spline internal teeth 14 become parallel with the center line 16. Ordinary clearance can be maintained and there is no possibility of faulty disengagement. Thus, a good engaging/disengaging operation of the clutch is ensured.

Further, since the spline internal teeth 14 are formed at a specified inclination angle, manufacturing of the spline hub 10 can be carried out easily. Moreover, since the spline internal teeth 14 are comparatively hard and are not easily worn out, a correct inclination angle can be maintained for a long period.

(2) Second embodiment

FIG. 2 shows a clutch disc according to the second embodiment of the invention, internal teeth 14' are formed in a spline hole 12' of the spline hub 10'. The spline internal tooth 14' are formed in parallel with a center line 16' of a main drive shaft (not shown). A retaining plate 22' and a clutch plate 24' are pressed on opposite sides of a flange 18' of the spline hub 10' with through friction washers 20', 20' therebetween. A pressing surface 34' which presses on the friction washer 20' is formed on the clutch plate 24'. A cushioning plate 26' is fixed to an outer peripheral part of the clutch plate 24', and facings 28' are fastened on the cushioning plate 26'. The facings 28' are pressed on a flywheel 32 by a pressure plate 30 to transmit power.

Figure 3:
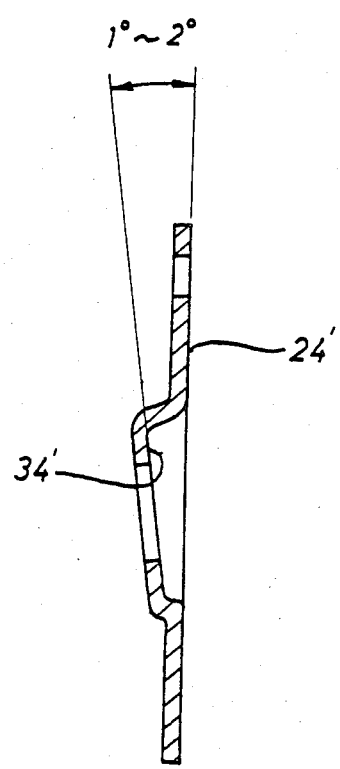
FIG. 3 is a vertical sectional view of a clutch plate.

The clutch plate 24', FIG. 2, includes the pressing surface 34' as shown by FIG. 3. The pressing surface 34' is so formed as to be inclined by about 1°~2° in relation to the outer peripheral part of the clutch plate 24' (a forced inclining mechanism). The pressing surface 34' is formed through means of a drawing work by press machine during a working process of the clutch plate 24'. The pressing surface 34 is pressed on the flange 18' through the friction washer 20' as shown in FIG. 2, and the outer peripheral part of the clutch plate 24' is inclined in relation to the flywheel 32 by an amount of inclination angle of the pressing surface 34 under a condition that the pressing surface 34 is pressed on the friction washer 20'.

In operation, where the facing 28' is pressed on the flywheel 32 by the pressure plate 30, the outer peripheral part of the clutch plate 24' is forcedly changed to a position parallel with the flywheel 32. In this state, the pressing surface 24' of the clutch plate 24 presses on the flange 18' through the friction washer 20', the spline hub 10' inclines with respect to the center line 16', and the spline internal teeth 14' of the spline hub 10' is pressed on the spline external teeth (not shown) of the main drive shaft in its inclined position. One end of the spline internal teeth 14' deeply cuts into the spline external teeth, the other end of the spline internal teeth 14' shallowly meshes with the spline external teeth. Thus, a clearance between the spline internal teeth 14' and the spline external teeth becomes zero.

Since the position of the spline hub 10' can be changed freely under a condition where the facing 28' is released from the flywheel 32, the spline internal teeth 14' become parallel with the center line 16' to enable an ordinary clearance to be maintained. Therefore, there is no possibility of the faulty disengagement of clutch under this state.

As mentioned above, in the clutch disc according to the second embodiment of the present invention and including the spline hub spline fitting onto the main drive shaft and the clutch plate 24' pressing on the flange 18' of the spline hub 10', the pressing surface of the clutch plate on the flange 18' of the spline hub 10' is so formed as to be inclined in relation to the outer peripheral part of the clutch plate 24'. The spline hole 12' of the spline hub 10' is inclined in relation to the axis of the main drive shaft under the condition that the facing surface of the clutch disc is pressed on the flywheel. The spline hole 12' of the spline hub 10' is kept parallel with the axis of the main drive shaft under the condition that the facing surface is not pressed thereon. Therefore, when the facing 28' is pressed on the flywheel 32, the spline internal teeth 14' cut the spline external teeth (not shown) of the main drive shaft by a depth corresponding to the inclination angle of the pressing surface 34'. One end of the spline internal teeth 14' deeply cuts into the spline external teeth. The other end of the spline internal teeth 14' shallowly meshes with the spline external teeth. Thus, the clearance between the spline internal teeth 14' and the spline external teeth becomes zero chattering sound is not emitted from between the spline internal teeth 14' and the spline external teeth even when the engine torque fluctuates. A silent clutch disc can be provided.

When the pressure on the facing 28' is released in operating the clutch, the position of the spline hub 10' becomes freely changeable and the spline internal teeth 14 become parallel with the center line 16. The ordinary clearance can be maintained and there is no possibility of faulty disengagement at the time when the clutch is operated. Thus, a good engaging/disengaging operation of the clutch is ensured.

The pressing surface 34' may be formed by a press work on the outer peripheral part of the clutch plate 24' at a specified inclination angle in a manufacturing process of the clutch plate 24'. The pressing surface 34' can be worked out easily and the pressing surface 34 having a good flatness can be formed with a highly accurate inclination angle.

Effect of the invention

As mentioned above, the inclining mechanism, as described in the foregoing embodiments, is provided in the clutch disc according to the present invention. The chattering sound emitted from between the spline internal tooth of the spline hub and the spline external tooth of the main drive shaft is controlled. The clutch disc incurs no possibility of faulty disengagement at the time of operating the clutch.

Other embodiments (1) In the embodiment of FIG. 4, the spline hub is inclined teeth by inclined surface 42" for which one side face of a stepped part is utilized, for example when the stepped part 40" is formed on the flange 18" without using a friction washer such. Further, the flange 18" may be inclined as shown in FIG. 5.

(2) The inclination angle of the spline internal teeth 14, FIG. 1, is not limited to 1°~2°, but may be of a different angle depending on the diameter, length etc., of the spline hole 12.

What is claimed is:

1. A clutch disc having a flanged hub spline with a spline hole fitted onto a main drive shaft having a center axis, characterized by that the clutch disc is equipped with a forced inclining mechanism for forcedly inclining the axis of the spline of said hub relative to the center axis of the main drive shaft when the facing surface of said clutch disc is pressed against a flywheel, and for the keeping the spline hole of said spline hub parallel to said center axis of said main drive shaft when said facing surface of said clutch disc is out of pressed contact with said flywheel.

2. A clutch disc as set forth in claim 1, in which said forced inclining mechanism is in the spline internal teeth of said spline hole.

3. A clutch disc as set forth in claim 1, in which said forced inclining mechanism includes a clutch facing surface on said spline hub inclined in relation to an outer periphery of said clutch disc, said spline of said spline hub being inclined relation to said center axis of said main drive shaft when said facing surface of said clutch disc is pressed against said flywheel, and said spline of said spline hub is kept parallel with said axis of said main drive shaft when said facing surface is out of pressed contact with said flywheel.

4. A clutch disc as set forth in claim 1, in which said forced inclining mechanism includes an inclined surface on said flange of said spline hub and said spline hub is inclined by said inclined surface of said spline hub.

5. A clutch disc as set forth in claim 1, in which said forced inclining mechanism includes an inclined flange on said spline hub.

6. A clutch disc having a flanged hub spline fitted onto a main drive shaft having a center axis, characterized by that the spline teeth of said spline hub are inclined in relation to said center axis of said main drive shaft at an inclination angle of 1°-2° so that the spline hole of said spline hub is forcedly inclined in relation to said center axis of said main drive shaft when said clutch disc is in pressing engagement with a flywheel, and said spline hole of said spline hub is kept parallel with said center axis of said main drive shaft when said facing surface and said flywheel are disengaged; a retaining plate and a clutch plate are pressed on opposite sides of said flange of said spline hub through friction washer; and a facing is mounted at a radial outer periphery of said clutch plate through a cushioning plate.

7. A clutch disc having a flanged spline hub spline fitting onto a main drive shaft having a center axis and a clutch plate is pressed onto said flange of said spline hub, characterized by a clutch plate mounted on said flange of said spline hub said clutch plate having a pressing surface at an inclination angle of 1°-2° relative to said center axis of said main drive shaft, said spline of said spline hub being forcedly inclined in relation to said center axis of the main drive shaft when said pressing surface of said clutch plate is pressed against a flywheel and said spline of said spline hub is kept parallel with said center axis of said main drive shaft when said pressing surface is out of pressing engagement with said flywheel, a retaining plate and a clutch plate are pressed on opposite sides of said flange of said spline hub through friction washers, and said pressing surface is mounted on a radial outer periphery of said clutch plate through a cushioning plate.

* * * * *